ROBERT A. KRAUS,
EDMUND J. KRAUS,
INVENTORS.

BY
ATTORNEYS.

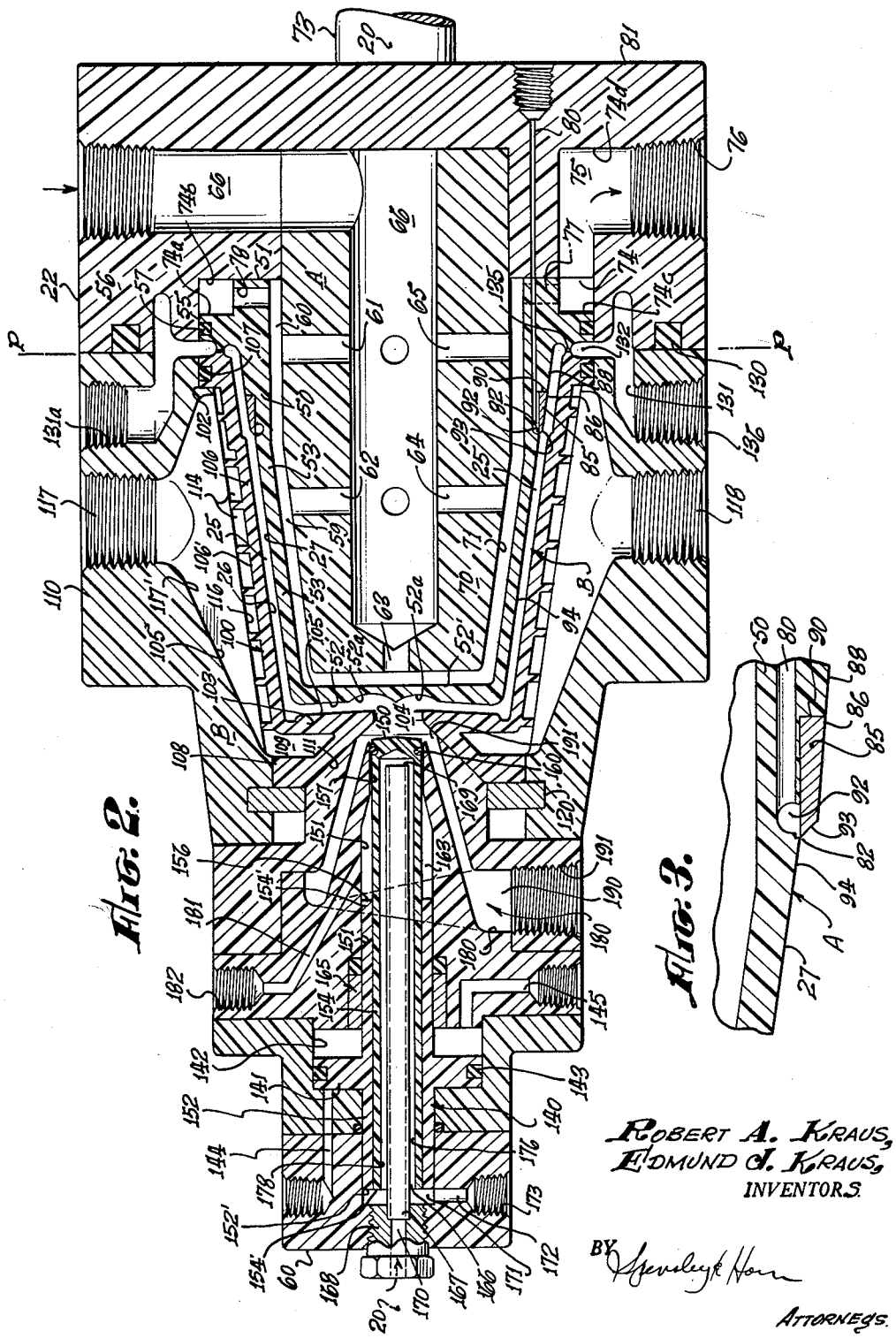

Robert A. Kraus,
Edmund J. Kraus,
INVENTORS

BY
ATTORNEYS.

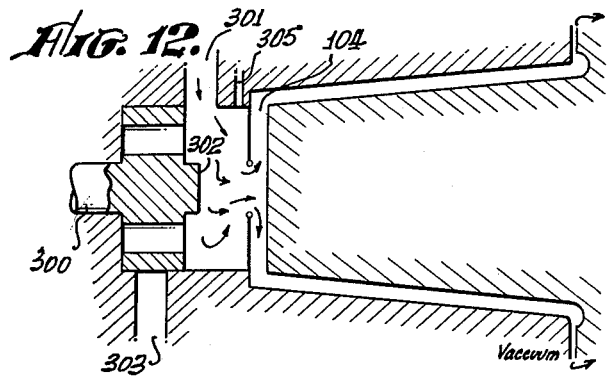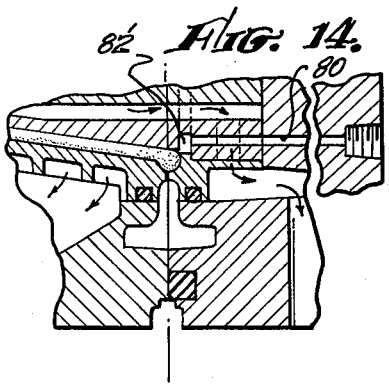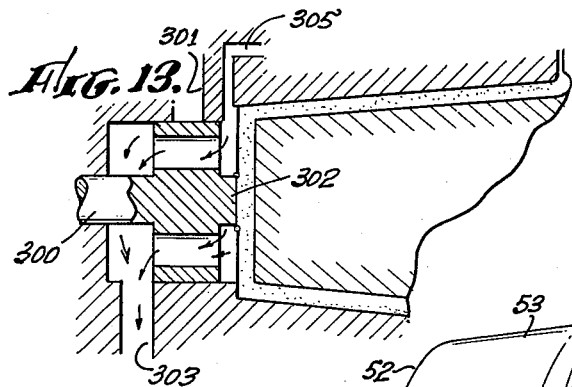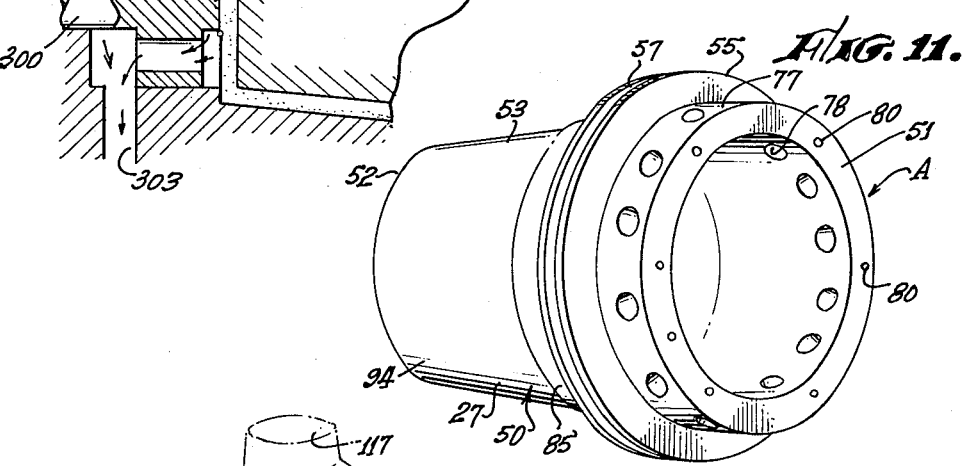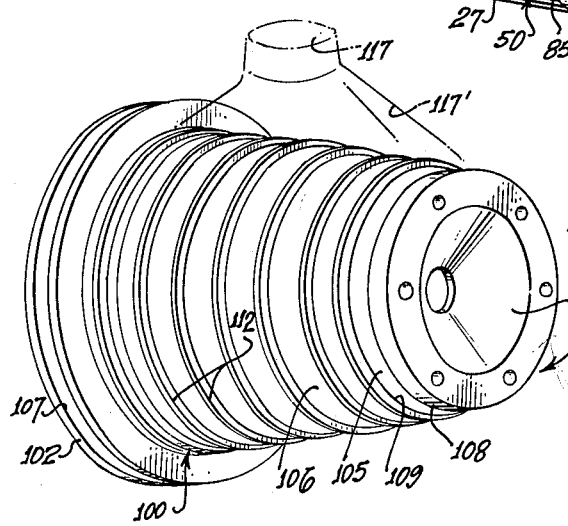

United States Patent Office 3,167,811
Patented Feb. 2, 1965

3,167,811
APPARATUS FOR FORMING THIN WALL ARTICLES OF MANUFACTURE FROM EXPANDABLE FUSIBLE PLASTIC
Robert A. Kraus and Edmund J. Kraus, both of 1024 Oak Ave., Duarte, Calif.
Filed Apr. 14, 1960, Ser. No. 22,165
2 Claims. (Cl. 18—5)

This invention relates to the manufacture of cups and more particularly to an improved apparatus for manufacturing cups from granular plastic material.

During recent years expandable or foamable plastic materials have been developed which have properties peculiarly adapted to the manufacture of containers such as cups and food containers. Such expandable plastic materials are available in the form of small beads containing an expanding agent under various trade names such as Pelistan, which is a trademark of the Dow Chemical Co., and Dylite, which is a trademark of the Koppers Company, Inc. The most commonly available expandable plastics of this type are formed of chemicals such as polystyrene or the like and are formed as beads containing a foaming or charging agent such as methylchloride, butane, heptane or the like. Normally the plastic material is supplied as small beads which are impregnated with the foaming agent and are of a size which varies from the manufacture but is of the order of sixty to seventy-thousandths of an inch in diameter. When the beads are confined in a retaining mold and heated they expand and adhere together to form a unicellular rigid material. The desirable characteristics of the material which make them particularly adapted to the manufacture of containers for liquids and foodstuffs includes a low thermoconductivity, low water absorption, low densities, a lack of odor, and the fact that they have no toxicological effects. Thus, for example, cups formed of such material are particularly desirable for containing hot or cold liquids since the heat insulating properties of the material will retain the temperature of the liquid contained therein relatively constant. In addition, unlike various paper cups formed of paper or other pulp products, no taste is imparted to the liquid contained. In addition, the material is sufficiently inexpensive that the cups may be made disposable and manufactured as an item which is intended to be disposed of after one use. The characteristics of the material make it possible to dispose of the cup by smashing or fracturing with no danger of cutting or harming the user.

However, in the manufacture of such containers and other intricate shapes from the foamable polystyrenes, manufacturing difficulties are encountered which are of a nature peculiar to the material itself and prior art apparatus for forming intricate shapes from the material have had various disadvantages for mass production or economical production of intricate shapes such as cup-shaped articles. The apparatus of the present invention is intended to provide an economical method and means for forming shapes of finished unicellular articles of such material. The apparatus of the present invention is particularly adapted to the manufacture of cups for holding liquids and food-stuff and will accordingly be described throughout the following specification in connection with such use. It is to be understood, however, that the various novel features of the present invention are not limited to the manufacture of cups, containers or any particular article of a particular shape, but rather are adaptable to the manufacture of many different products. For clarity of description, however, the manufacture of cups is utilized as an example of the utility of the present invention.

Among the various characteristics of the material which produce manufacturing problems is the fact that the material is not easily flowable and if heated in a mold without even dispersion of the unexpanded material throughout the mold a uniform density in the finished article will not be obtained. Among other reasons for the difficulty in flow is the low density of the material and the fact that prior to heating it occupies a much lesser volume than after heating. In addition, the material has a tendency to be statically electrically charged such that the particles will have some cohesion one for the other and will not easily flow into small spaces. Also, in manufacturing bodies from such expandable plastic beads, which bodies are of intricate shape or have thin vertical sections, it is necessary to prefoam the material to partially increase its size. That is, prefoaming or preexpansion is a controlled partial expansion of the expandable beads. Such prefoaming must be carried out in order to assure complete expansion of the material and to obtain uniform densities and cohesion between the various beads. The prefoaming operation causes the beads to be expanded to a size at which the above mentioned difficulties are magnified. Thus, such beads can be utilized to manufacture a structure having a discrete closed cellular wall which is impervious to moisture, if the beads can be uniformly distributed throughout a mold and heat applied thereto.

Accordingly, it is an object of the present invention to provide an improved apparatus for forming finished articles from fused expandable plastic beads.

It is another object of the present invention to provide such an apparatus wherein the plastic beads can be automatically and uniformly fed to the cavity in the closed condition of the cavity.

Yet another object of the present invention is to provide such a molding apparatus in which both the internal and external walls of the apparatus are uniformly heated to provide a uniform fusion and expansion of the beads positioned therein.

It is a still further object of the present invention to provide such a molding apparatus which is entirely automatic in operation.

A still further object of the present invention is to provide such a molding apparatus with ejection means integral therewith for quickly and efficiently removing the finished article from the mold.

It is yet another object of the present invention to provide such a molding apparatus by means of which a measured quantity of such beads are fed to the mold apparatus to insure uniform filling of the cavity prior to expansion and fusion thereof.

Yet another object of the present invention is to provide such an apparatus which fills the mold cavity with a measured amount of such expandable plastic beads and automatically removes from the vicinity of the mold any excess materials in order to prevent the unwanted expansion and fusion of such materials.

It is a still further object of the present invention to provide such a mold apparatus which is simple and economical in use and which can be utilized over repeated molding operations and for continuous length of time.

It is yet another object of the present invention to provide such an automatic molding apparatus which has a short cycle of operation for maximum production of such structures in any given length of time.

It is another object of the present invention to provide an automatic molding apparatus which can be oriented in the position most feasible for production purposes.

Yet a primary object of the present invention is to provide an automatic molding apparatus for forming objects of expandable plastic beads wherein a vacuum is provided in the mold cavity to supply an increased pressure differential between the gas contained in the beads and the exterior thereof. Since the foaming agent impregnated in the beads will deteriorate in storage, in prior art apparatus it has been necessary to discard the beads at a certain age thereof. The present invention allows the use of such beads by, in effect, supplementing the internal pressure created in the beads by heating and molding the beads in a vacuum.

It is another object of the present invention to provide a means for molding cups and similar articles as described having a non-planar bottom surface.

The novel features which are believed to be characteristic of the present invention both as to its organization and method of operation, together with further objects and advantages thereof, will be better understood from the following description considered in connection with the accompanying drawing in which a presently preferred embodiment of the invention is illustrated by way of example. It is to be expressly understood, however, that the drawing is for the purpose of illustration and description only and is not intended as a definition of the limits of the invention.

In the drawing:

FIGURE 2 is a detailed view in section showing one of the molds of a plural mold machine;

FIGURE 3 is a detailed view of the ejection means of the mold shown in FIGURE 2;

FIGURE 10 is a view in perspective of the female element of the mold apparatus;

FIGURE 11 is a view in perspective corresponding to FIGURE 10 of the male mold element;

FIGURE 12 is a partially schematic view of an alternative means for feeding the plastic beads to the cavity showing the apparatus in the input condition;

FIGURE 13 is a view corresponding to FIGURE 12 showing the apparatus in the closed position at which excess beads are exhausted; and FIGURE 14 is a sectional view of an alternative cup and ejection means.

Figure 1:
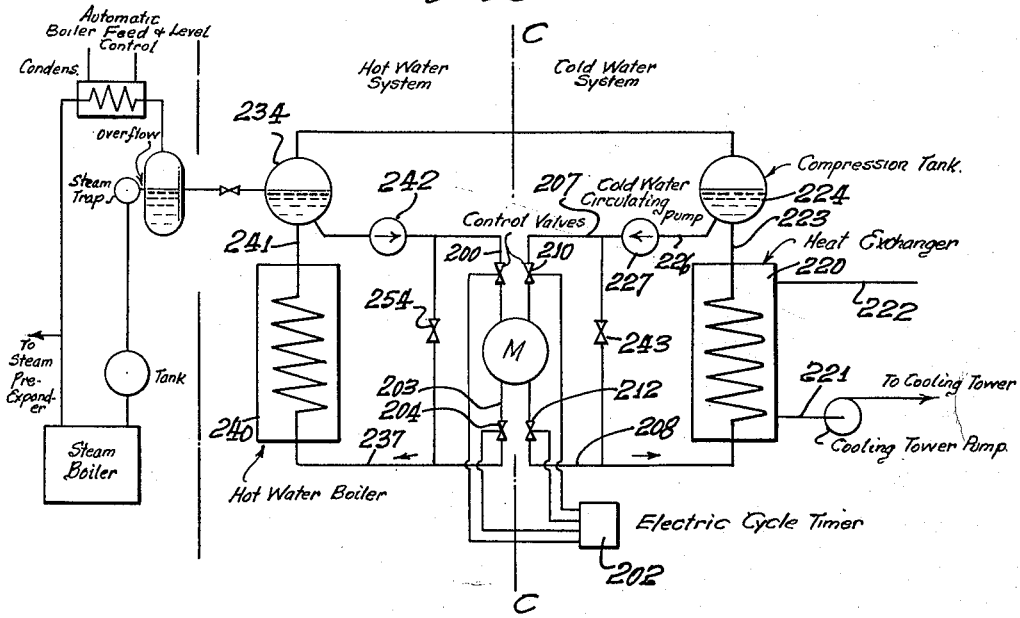
FIGURE 1 is a schematic flow diagram illustrating the operation of the present invention.

As discussed hereinabove, the expandable plastic beads as obtained from the manufacturer are designated as raw beads and can be purchased in various sizes. In the present use of this invention such beads are pre-expanded in accordance with standard molding procedures heretofore known to the art to a diameter at which they will fill the mold uniformly in the proper quantity for a finished wall, as more fully described hereinafter. In the prefoamed condition if the plastic beads are contained within a closed volume such as a cup-shaped cavity and subjected to heat the beads will further expand under such temperature and will cause an internal pressure to be created. During the final expansion of the beads they will totally and uniformly fill the cavity and will fuse together to form a liquid-impervious wall. In expanding, the pressure generated by the beads and by the gases escaping therefrom will be of the order of thirty pounds per square inch. In the presently preferred embodiment of this invention the beads are heated in the final molding operation to a temperature of the order of 310° F. If the beads are maintained at this temperature for a period of the order of five seconds they will expand and fuse to form an integral wall which is in effect unicellular and impervious to passage of moisture therethrough.

Referring now particularly to FIGURE 2, one of the molds constructed in accordance with the present invention is shown in detail and includes in general a male portion and a female portion which are separable along a parting line P in FIGURE 2. The male portion is designated generally as A while the female portion is designated generally as B. In FIGURE 2 the longitudinal axis 20 is shown extending throughout the length of the mold and will be referred to hereinafter as a reference point to describe the orientation of the various parts of the mold. Thus, as shown in FIGURE 2, the mold is separable at the parting line P by moving the male portion of the mold and the female portion of the mold relative to one another along the longitudinal axis 20. The parting line P will extend from the exterior wall 22 of the mold inward transversely to the longitudinal axis 20 of the cavity 25 as described hereinafter. The cavity 25 is defined by the internal wall 26 of the female mold element and the external wall 27 of the male mold element, which walls are substantially parallel and spaced apart by the wall thickness desired in the finished structure.

Figure 6:
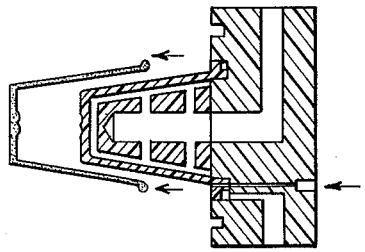

A cup-shaped structure is shown in connection with the mold of FIGURE 2 and is shown as a finished article 40 in FIGURE 6 of the drawings. It will be noted that the cup has an upper flanged edge 41 which is connected by frusto-conical side wall 42 to a substantially transverse bottom surface 43. The wall thickness 44 is substantially uniform throughout the structure. The side walls have a slight draft of five degrees, for example, to facilitate removal of the article from the mold. It should be noted in this connection that the finished cup has a discontinuity in the slope of the side wall as indicated at 46 of FIGURE 6. The function of this discontinuity will become more apparent hereinafter in connection with the description of operation of the mold. The wall thickness of the structure being formed in the illustrative embodiment is of the order of .060 to .090 inch. The male portion 50 of the mold is formed of material which has a highly polished surface 27 and which has a high heat conductivity for the quick transference of heat through the mold wall. The male mold element 50 extends from a transverse shoulder 51 to a transverse bottom surface 52 with the side wall of the mold portion 53 being of frusto-conical configuration. Thus, the mold element 50 has a flanged upper surface which is transverse to the longitudinal center line of the mold and which extends outwardly from the center line 20 to a radius at 55 in the figure which is greater than the maximum radius of the mold cavity. The mold element 50 is connected to the mold housing element 56 at the radial line 55 and is formed with a gas-tight seal 57 supplied by an O-ring in a suitable O-ring groove. The mold element 50 then extends toward the first end 60 of the mold by means of a frusto-conical shaped side wall 53 which is integral with the bottom surface 52. Thus, the male portion of the mold is also of a cup-shaped configuration with a closed bottom surface. The mold element 50 is joined to the mold body and more particularly to the male portion 56 thereof. That is, the mold section 50 is formed as a separate unit with respect to the mold body 56 in order to provide necessary cavities for the transmission of heating fluid to the internal wall 59 of the mold portion 50. When assembled the mold portion 50 becomes an integral portion of the mold body 56 and defines therewith the mold surface 27 together with fluid passages in the form of an annulus 60, which annulus is connected by various passages such as 61, 62, 63, 64 and 65 to a fluid flow conduit 66 which in turn is in communication with the exterior surface of the mold body and which is threaded in order to be fitted with a fluid inlet line (not shown) as described more particularly hereinafter.

Thus, the body portion 56 of the mold defines a male element 70 with an exterior wall 71 having a configuration similar to the configuration of the internal wall 59 of the male mold element 50 but spaced therefrom by a distance sufficient to allow the passage of fluid through the annular cavity 60 defined therebetween. That is, the male body portion 56 of the mold assembly is a transversely extending housing with a male element extending inwardly and into the male portion 50 of the mold but spaced therefrom by a distance sufficient to form an annular cavity 60 adapted to receive fluid through ports 61 through 65 from the fluid flow path 66. As shown in FIGURES 2, 10 and 11, the mold elements 50 and 100 which define the molding cavity 25 are formed of metal, such as aluminum which has a high rate of heat conductivity. Conversely, it is preferable to form the mold body portions 56 and 110 of a heat insulating material such as epoxy resin. As will become more apparent hereinafter in connection with the description of operation of the apparatus and the method of the present invention, it is necessary to raise and lower the temperature within the mold cavity 25 quickly during the manufacturing cycle, and it is accordingly necessary to avoid the creation of heat sinks in those portions of the mold apparatus where a temperature change is not necessary.

The male portion 56 of the mold body is thus formed of cast epoxy resin and connected to an operating rod 73 at the outer end of the mold, and is thereby adapted to be moved longitudinally along the center line 20. An annulus 74 is also defined by the male body 56 in communication with the fluid recess 60, through a plurality of fluid ports 78 extending through the cylindrical annular ring 77 which is the rearward portion of the male mold element 50. The annulus 74 is then coextensive with a fluid outlet passage 75 which is in turn connected to a fluid outlet line at the female fitting 76. The annulus 74 is separated from the recess 60 by the annular ring 77 portion of mold element 50 which contains radial fluid passages 78 therethrough. In addition, the male body portion 56 defines a plurality of air inlet passages 80 extending from the outer end 81 of the mold inward and through the wall of the male mold to a position proximate the break 82 in the slope of the wall. That is, as shown particularly in FIGURE 2, an annular ring 85 is positioned upon the outer surface 27 of the male mold and has a slope on the external surface 86 thereof which is coextensive with the slope of the male wall 88. A shoulder 90 is formed at both the annular ring 85 and the male wall in order to accommodate insertion of the annular ring 85. An annular groove 92 is formed in the exterior wall at the inner end of the annular ring 85 and extending slightly therebeyond such that an annular opening is defined between the outer end 93 of the ring 85 and the continuing surface 94 of the sloping male wall. Thus, the outer surface is discontinuous at this point and defines the discontinuity 46 in the cup. This ring 85 then provides a means for forming an annular opening in communication with the air passages 80, which opening is small in size but extends circumferentially about the male mold and is in communication with the air passages 80. Thus, as described more fully hereinafter, air injected through the opening 80 and through the opening 82 will form an ejection stream of air for removing the finished structure from the male mold when it adheres thereto. By blowing between the cup and male mold, the cup is expanded slightly for easy removal of the cup from the male mold.

Thus, referring particularly to FIGURES 2 and 11, the male mold element comprises a frusto-conical side wall 53 with a bottom wall 52' defining the interior bottom surface of the mold cavity at the surface 52. The interior wall surface of the mold cavity 27 and the bottom surface 52 thereof are to the left of the parting line P in FIGURE 2, whereas the radially extending flange 55 having an O-ring groove therein at the radial surface 55, where it is in abutting relationship with the mold body 56, is to the right of the parting line P. Extending longitudinally from the flange 55 is the annular ring 51 which defines a plurality of fluid ports 78 that connect the fluid cavity 60 with the annular fluid outlet 74. The fluid outlet 74 is in communication with the fluid outlet passage 75. It should be noted that for optimum fluid circulation the fluid inlet line 66 extends from the upper portion of the mold body radially inward into communication with the longitudinally extending fluid inlet passage 66. The passage 66 is then connected to the annular cavity 60 which is in direct communication with the interior wall of the male mold element to cross the entire surface thereof. Thus, fluid enters through the inlet 66 and passes through the various radial ports 61, 62, 63, 64 and 65 to the fluid cavity 60 in contact with the walls 53 and 52' of the mold. The fluid then circulates through the fluid ports 78 and into the annular outlet fluid passage 74' to the fluid outlet 75 positioned oppositely from the fluid inlet 66. The annular fluid outlet 74 increases in longitudinal width toward the fluid outlet 75 such that its cross-sectional area is considerably greater as it approaches the fluid outlet 75. Thus, as shown in FIGURE 2, the annulus has a width extending longitudinally from the point 74a to 74b at the uppermost position of the annulus and increases to a considerably greater width extending from the point 74c to 74d at the lowermost portion of the annulus. Thus, as more radial ports 78 contribute their flow to the outward flow of fluid, the cross-sectional area of the annular passage increases to accommodate such increased flow.

At this point it should be noted in connection with the presently preferred embodiment as shown in FIGURE 2 that the end surface 52 of the male mold element 50 is not planar and does not follow a smooth curve but conversely circular indentations 52a are provided which in transverse cross-section give the surface 52 a double concave configuration emanating from the center axis of the bottom wall 52'. That is, an indentation is provided in the surface 52 which is symmetrical about the longitudinal axis through the apparatus and which curves radially from the axis by describing a concavity extending from the high point at the axis as shown in FIGURE 2. As will become more apparent hereinafter, this surface provides a means for causing the plastic beads which impinge upon the surface 52 to be dispersed radially and in effect imparts the necessary flow to the beads causing the beads to be spread radially outward from the axis rather than piling up at this point.

Referring now to FIGURES 2 and 10, a female mold element 100 of the mold apparatus is similar in configuration to the male element but is spaced therefrom such that the inner wall 26 of the side wall 106 defines the exterior wall of the mold cavity 25. The female mold is continuous in configuration and symmetrical about the longitudinal center line 20 of the apparatus with a flanged upper end 102 to the left, or female side, of the parting line P and a closed bottom wall 103 defining the bottom surface 105 of the mold cavity 25. The flanged upper end 102 has a radius approximately equal to the radius of the flange 55 of the male element and is disposed adjacent the male flange 55 when the female and male portions of the molding apparatus are in mating engagement. A sealing ring groove 107 is provided in the circumferential surface of the flange 102 to form a sealing engagement with the mold body 110. The bottom wall 103 of the female mold element is approximately equal in thickness to the side wall 106 but is formed integral with an annular lip 108 which extends longitudinally to the left of the bottom wall in FIGURE 2 to define a radially extending fluid groove 109. That is, the bottom wall of the female mold element is, in effect, extensive in length to define a radial outwardly convergent outer surface 111 and is in effect divided into the end wall portion 103 and the annular lip portion 108 by the radial fluid groove 109 which is formed to provide a fluid path at the proper wall thickness from the inner mold surface 105. The outwardly convergent surface 111 extends from the opening 104 through the end wall 103 which is the opening through which the plastic beads are fed to the mold cavity 25 as defined hereinafter.

A series of transversely extending circumferential baffles 112 are formed upon the outer surface of the side wall 106 of the female mold element to define fluid circulating paths 114. That is, in the presently preferred embodiment a series of equally spaced-apart circumferential baffles 112 are formed upon the outer surface of the wall 106 and are of substantially equal height. In the embodiment shown eight such baffles are used. Thus, the female mold element 100 is affixed within the female body portion 110 of the molding apparatus which is that portion to the left of the parting line P. The mold body 110 is again formed of a material which is resistant to heat transfer such as epoxy resin. The mold body 110 defines a mateable frusto-conical opening defined by the wall 116 which conforms to the configuration of the exterior wall of the female mold element but is spaced therefrom to define the fluid flow cavities 114 between the exterior surface 106' of the side walls 106 and the wall 116 of the mold body 116. The wall 116 is spaced from this surface 106 by an amount approximately equal to the height of the baffles 112. Thus, when the female mold element 100 is positioned in the mold body 110 the baffles 112 are in circumferential contact with the interior wall of the cavity defined by the mold body, with which the mold element 100 is mateable. The baffles in contact with the wall 116 therefore describe a plurality of annular fluid paths extending circumferentially about the side wall 106 of the mold element between the side wall and the mold body. In addition to the plurality of circumferential fluid paths 114 defined between the baffles 112 the fluid groove 109 provides an additional fluid path which passes over the outer surface of the end wall 103. A fluid inlet conduit 117 is provided from the upper surface of the mold body 110 and is threaded for the connection of a fluid inlet line. As shown particularly in FIGURE 2 and schematically in FIGURE 10, the fluid inlet conduit 117 is expanded longitudinally at the upper inlet portion of the fluid passages in order to span the plurality of annular passages 14 and distribute fluid to each. Thus, at the upper portion of the mold body the fluid inlet passage 117 is in effect fan-shaped and is in fluid communication with the fluid groove 109 and each of the fluid annular passages 114. Similarly, a fluid outlet conduit 118 is provided at the lower portion of the mold body 110 and is threaded for connection to a fluid outlet line. Like the inlet pasage 117, the fluid outlet passage 118 is expanded longitudinally to provide fluid communication with the fluid groove 109 and each of the fluid annular passages 114. Thus, fluid passing into the mold body 110 will flow through the longitudinally expanded portions 117' of the fluid inlet and into each of the annulus passages 114 where it will progress by gravity flow down opposite sides of the side wall 106 in contact with the surface 106' and will pass from each of the passages into the fluid outlet passage 118.

The female mold element 100 is affixed to the mold body 110 by suitable means such as a mounting ring 120 which is positioned within the mold body with a flange extending radially inward mateable with the annular lip 108.

Thus, as shown particularly in FIGURE 2, the mold apparatus comprises in general a male mold portion 56 with the male mold element 50 affixed thereto and a female element mold body portion 110 with the female mold element 100 affixed thereto. The male and female portions are provided with fluid inlet conduits which distribute the fluid from the exterior source through cavities which are in contact with the walls of the mold element defining the mold cavity 25. Means are provided circulating the fluid to provide even flow over the required surfaces after which the fluid is discharged from the mold apparatus through the fluid outlets 75 and 118. As discussed hereinbefore, the mold body portions are separable at the parting line P and a sealing ring 130 is provided at the parting line between the body portions 56 and 110 to provide a fluid seal between the mated portions. The body portion of the mold apparatus also defines at the parting line a vacuum annulus 131 which is in communication with the cavity 25 at the parting line P. That is, as shown particularly in FIGURE 2, an annular-shaped cavity which in transverse cross-section is convergent toward the upper end of the mold cavity 25 is defined by the mated male 56 and female 110 body portions of the mold apparatus. The annulus 131 is of substantial width and narrows down to a decreased area 132 extending between the flanges 55 and 102 of the male mold element and female mold element respectively. At the radially innermost point of the vacuum annulus 131 a small circumferential passage 135 is provided to allow the passage of air from the mold cavity 25 to the vacuum annulus 131. The width of the air passage 135 when the mold apparatus is in the mated condition is such that it is too small to allow the passage of the plastic beads therethrough. Thus, if a vacuum is created in the vacuum annulus 131 it will extract air from the mold cavity 25 but will not admit of the passage of the plastic beads from the mold cavity to the vacuum annulus. A vacuum inlet conduit 136 is provided through the body portion of the mold apparatus into communication with the vacuum annulus 131. Thus, as shown in FIGURE 2, in the female body portion 110 a conduit which is threadably fitted for connection to an air line is defined which is in communication with the vacuum annulus 131. When the mold bodies are mated the vacuum annulus 131 is a closed annulus in communication with the mold cavity 25. When a vacuum pump is connected to the air line (not shown) which is threadably connected to the air conduit 136, the vacuum drawn in the annulus 131 extracts air from the mold cavity and reduces the ambient air pressure therein without allowing the escape of the plastic beads therefrom.

In the female body portion 110 of the mold apparatus there is provided a reciprocating plunger 140 which is reciprocally mounted along the longitudinal center line of the mold apparatus. The plunger 140 includes a transversely extending flange which defines a piston 141 positioned within the cavity 142 defined in the mold body. The cavity 142 is thus a cylinder which is substantially longer than the thickness of the flange in order to allow longitudinal movement of the flange or piston 142 therein. The outer diameter of the piston 141 is in sliding contact with the cylindrical wall of the cylinder 142 and is sealed with respect thereto by means of an O-ring 143.

An air inlet port 144 is provided through the mold body extending from the exterior thereof to a position at the forward or right side of the cylinder 142 in FIGURE 2 such that air under pressure admitted through the passage 144 will exert a force upon the piston in the direction toward the mold cavity. Similarly, the second air inlet port 145 is provided through the mold body in communication with the cylinder 142 at the position to the right of the piston in FIGURE 2 such that air or fluid admitted through the passage 145 will force the piston 142 to the left in FIGURE 2. Threaded connecting means are provided for the air passages 144 and 145 for the connection of air lines to the passages. The mold body at this portion is again formed of plastic such as epoxy resin to avoid the creation of a heat sink in the body of the mold apparatus. The plunger 140 is adapted at the inner end 150 thereof to mate with the opening 104 through the end wall of the female mold element 100. The plunger 140 is in general an elongate cylinder with the piston 142 extending radially therefrom. The plunger 140 is longitudinally movable within the cylinder 151 formed in the mold body symmetrically about the longitudinal center line thereof. For reasons which will be discussed hereinafter, the plunger 140 preferably is formed partially of plastic and partially of metal for heat conduction at the inner end of the plunger only.

In its presently preferred form the plunger includes a plastic sleeve 152 which has an outside diameter substantially equal to the inside diameter of the cylinder 151 and is in sliding contact therewith. The sleeve 152 is formed of plastic as is the piston 142. Positioned within the plastic sleeve is an elongate aluminum cylinder having an outside diameter approximately equal to the inside diameter of the plastic sleeve 152. The tubular plunger sleeve 154 is of substantially greater length than the plastic sleeve and piston portion of 152 and is affixed thereto such that the ends 152' and 154' are substantially coincident. The plunger cylinder 154 is however of considerably greater length than the length of the sleeve 152 such that the sleeve defines a transversely extending shoulder 156 at the forward end thereof which is well within the cylinder 151. On the other hand, the tubular plunger 154 extends forwardly of the shoulder 156 to the inner end 150 of the plunger assembly. At its inner end 150 the plunger is closed. The cylinder within which the plunger is longitudinally movable is reduced in diameter proximate the inner end 157 thereof to provide a cylindrical portion 157 having an inside diameter substantially equal to the outside diameter of the plunger 154 which is in sliding contact therewith. An O-ring or similar sealing means 160 is provided between the outside diameter of the plunger 154 and the inside diameter 157 of the reduced cylindrical portion. The cylinder 151 of larger diameter is connected to the cylinder 157 of lesser diameter by a convergent wall 158 which is spaced substantially to the right of the shoulder 156. Thus, an annular cavity 163 is defined between the mold body and the plunger 154 which extends longitudinally from the shoulder 156 to the cylinder 157. The longitudinal extent of the cylinder 157 is such that it is greater in length than the longitudinal travel of the plunger assembly 140.

Suitable bearing and sealing means 165 are provided at the interior wall of the mold body in sliding bearing contact with the sleeve 152 of the plunger assembly to allow continuous sliding movement of the plunger within the cylinder without undue wear and to provide a seal between the mold body and the cylinder 142. The plunger 154 is tubular with the inner end 150 being closed but with an open rearward end 166. Positioned within the tubular opening of the plunger is a fluid conduit 167 which is affixed to the mold body by means of a threaded plug 168. The tubular conduit 167 is stationary with respect to the plunger assembly and extends inwardly into the plunger to a position at which its inner end 169 is proximate the inner end 150 of the plunger 154 but spaced therefrom by a distance sufficient that the plunger in the retracted position as shown in FIGURE 2 will not be in contact with the inner end 169 of the tubular conduit 167. A fluid path 170 is provided through the connecting means 168 with suitable fittings for affixing a fluid line thereto. The inner end 152'–154' of the plunger and sleeve is spaced from the fitting 168 by a distance which is sufficient at the retracted position of the plunger to provide a fluid flow annulus 171 which is in communication with a fluid outlet port 172. The fluid outlet port is again provided with a threaded fitting 173 to which a fluid outlet line can be connected. Thus, a fluid flow path is provided such that fluid is admitted through the fitting 168 along the fluid path 170 and thus through the length of the tubular conduit 167 and from the inner end 169 thereof to the annular space 176 defined between the tubular conduit 167 and the inner wall 178 of the plunger 154. Fluid will thus flow into the annular space and will counterflow to the fluid annulus 171 and thence from the mold body through the fluid outlet port 172. Accordingly, fluid can be conducted from the fitting 168 to the inner end 150 of the plunger assembly, and from the assembly through the fluid outlet port 172.

It should be noted at this point that the plunger assembly, including the plunger 154 and the sleeve 152, is longitudinally movable from an extended position at which the inner end 150 of the plunger is substantially coincident with the opening 104 through the end wall 103 of the female mold element 100 to the retracted position shown in FIGURE 2 at which the plunger is substantially removed from the end wall 103 and out of contact therewith by a substantial distance. At the retracted position the sealing means 160 is in sealing contact with the lesser diameter of cylinder 157 such that the annular space 163 defined by the outer surface of the plunger 154 and the interior wall of the cylinder 151 is a sealed and closed cavity. At the extended position, however, the sealing means 160 is removed from the cylinder 157 such that an air passage exists from the cavity 163 through the cylinder 157 and to the exterior of the cylinder. Accordingly, an air path exists from the cavity 163 to the plastic feeding cavity 180 as described hereinafter. An air path 181 is defined through the mold body 110 from the exterior thereof at the threaded fitting 182 in communication with the annular cavity 163 surrounding the plunger proximate the inner end thereof between the shoulder 156 and the reduced diameter 157 of the cylinder. Thus, air can be injected into the cavity 163 and outward therefrom at the inner end of the cylinder through the space defined by the inner diameter 157 of the cylinder and the outer wall of the plunger when the sealing means 160 is extended from the cylinder 157.

Figure 7:
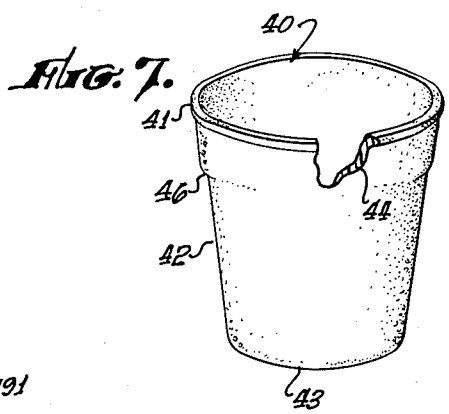
FIGURE 7 shows an illustrative cup utilized throughout the present application as an exemplary use of the present invention.

Referring now particularly to FIGURES 2 and 7, the plastic feeding path 180 is shown. Thus, an opening is defined through the mold body which extends from the exterior thereof radially inward. This opening 190 is provided with threads 191 for the connection of a conduit thereto. The opening 190 then progresses into a configuration as shown in FIGURE 7 which is a frusto-conical opening of decreasing thickness which is in communication at the inner end 191 thereof with the opening 104 through the end wall 103 of the female cavity 100. More particularly, the opening 190 into the mold body is spaced to the left in FIGURE 2 from the opening 104 into the mold cavity 25. The walls of the frusto-conical plastic flow path 180 are divergent to the left in the figure from the opening 104 and are in communication with the opening 190 from the exterior of the body. In the clockwise direction as shown in FIGURE 7 from the opening 190 the thickness of the frusto-conical annular space decreases. Thus, plastic beads admitted through the opening 190 will flow, under the force created by air pressure and the vacuum as described hereinafter, in a clockwise direction and also to the right and into the opening 104 when the plunger is in the retracted position as shown in FIGURE 2. The annular frusto-conical plastic feeding void has its greatest diameter proximate the inlet 190 and decreases in thickness as the plastic is dispersed toward the opening 104. Further details of the mold apparatus will become more apparent in connection with the description of the operation of the apparatus and the method of the present invention. However, it can be seen that if the plastic beads in their pre-expanded condition are supplied to the flow path 190 when the plunger assembly 140 is in the retracted position as shown in FIGURE 2, the plastic beads will be conducted into the mold cavity 25 under the influence of the vacuum created in the vacuum annulus 131. The beads will flow through the annular opening 180 and through the opening 140 in the end wall of the female mold element 100. When the plunger is moved to the extended position at which it closes the opening 104 to make a continuous end surface of the mold cavity 25, an air path exists between the air cavity 163 and the annular plastic flow cavity 180. When a stream of air is admitted through the passage 181 into the cavity 163, it then progresses outwardly past the plunger and into the plastic feed path 180 to blow any beads remaining therein from the path 180 and out of the proximity of the mold which is to be heated.

Referring now particularly to FIGURES 1 and 2, as has been previously discussed, when the mold cavity 25 is closed with the predetermined quantity of expandable plastic beads contained therein, and the beads are subjected to an increase in temperature to the temperature at which they expand and fuse, the beads will fuse into a unicellular mass having a configuration of the mold cavity. The molding apparatus is shown in the closed position in FIGURE 2 prior to or during the admission of the plastic beads through the path 180, the opening 104, and into the cavity 25. After the required quantity of beads has been conducted into the cavity and dispersed throughout, the cavity is subjected to a temperature sufficient to cause expansion and fusion of the beads. During this complete operation, i.e., the loading of the beads into the cavity 25 and the heating and fusion thereof, the high vacuum of the order of 10 microns of Hg is maintained in the vacuum annulus 131 and thus in the mold cavity 25 such that the ambient pressure surrounding the expandable beads is considerably less than atmospheric.

Hot water in a pressurized system is used as the heating means for raising the temperature of the beads, after which the mold is cooled to allow extraction of the molded cup in this embodiment again by means of coolant water circulated through the fluid passages surrounding the cavity. Accordingly, as shown in FIGURES 1 and 2, hot water is supplied from a hot water portion of suitable apparatus to be used in connection with the mold apparatus previously described, which hot water is conducted to each of the fluid inlets of the mold apparatus designated generally as M in FIGURE 1 and shown in detail and described in connection with FIGURE 2. Similarly, a cold water system is connected to each of the fluid inlets in order that both hot and cold water can be circulated selectively through the system to raise or lower the temperature of the mold cavity 25 at the proper point in the cycle of operation of the apparatus. Thus, referring particularly to FIGURE 1, a hot water fluid inlet line 200 is connected to each of the fluid inlet ports 66, 117 and 170. The hot water is connected to each of these ports through suitable fittings and is valved by a control valve 201 of the type which can be electrically cycled by means of an electrical cycle timer 202 connected therewith. A hot water outlet line 203 is connected to each of the fluid outlet ports 75, 118 and 172 at the appropriate fittings in the body of the mold apparatus. This hot water outlet line is also connected through an electrically operated valve 204. Similarly, a cold water line 207 is connected to each of the fluid inlets 66, 117 and 170 of the mold apparatus and a cold water outlet line 208 is connected to each of the fluid outlets 75, 118 and 173. The cold water lines are also valved by valves 210 and 212 which are connected to the electric cycle timer 202.

In FIGURE 1 the cold water system is shown to the right of the center line C for purposes of a schematic flow diagram, while the hot water system is shown to the left of the center line C. The cold water system includes a cooling tower (not shown) which is connected to a heat exchanger 220 through an outlet line 221 having a water pump therein and through an inlet line extending from the cooling tower to the heat exchanger designated as 222. The water system is closed such that water passing from the mold apparatus M through the cold water outlet line 208 when the valve 212 is opened will pass to the heat exchanger 220 where its temperature is lowered to approximately 120° for cooling purposes in the mold apparatus. The cooled water is passed from the heat exchanger through the cold water line 223 and into a compression tank 224 which maintains the cold water under pressure to create a pressurized water system. From the compression tank 224 the cold water inlet line 226 passes through a cold water circulating pump 227 which pumps the cooled water to the cold water inlet line 207 through the valve 210 when the valve 210 is opened at the proper time in the operating cycle. A by-pass line 228 is provided with a by-pass valve 229 for short-circuiting the cooling water when necessary. Both the hot water system and the cold water system are maintained in a pressurized condition by means of the compression tanks 224 for the cold water system and 234 for the hot water system. These tanks are of the type well known to the art which are pressurized by air pressure conducted to the tanks through the air line 235.

Figure 9:
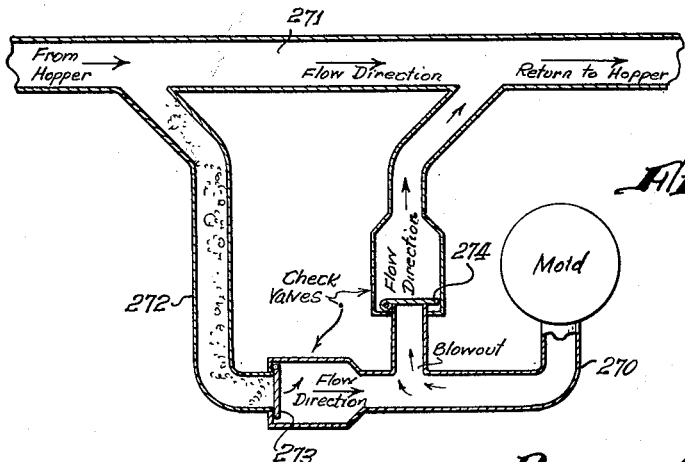
FIGURE 9 is a schematic flow diagram of the flow conduits to and from the mold which carry the plastic beads to and from the mold in accordance with the present invention.

Similarly, in the hot water system hot water is conducted from the mold apparatus through the fluid outlets 75, 118 and 173 into the hot water outlet line 203 and through the valve 204 to the hot water return line 237. The hot water return line 237 passes to the hot water boiler where its temperature is raised by passing through the hot water boiler 240. The hot water outlet line 241 leads from the boiler to the hot water compression tank 234 and thence from the tank through a hot water circulating pump 242 through the hot water inlet line 200 when the valve 201 is opened. A by-pass 243 is provided through the by-pass valve 243. In the presently preferred embodiment the hot water system supplies hot water to the fluid inlets 66, 107 and 170 through the hot water inlet line 200 at a temperature of approximately 310° and at a pressure of 100 pounds per square inch. Means are provided as shown in FIGURE 1 to utilize steam from the pre-expansion section of the apparatus as a source of steam for make-up water in the water system. It should be noted also that heat at the pre-expansion stage is utilized to raise the temperature of the beads fed to the mold by conduit 272 in FIGURE 9. Pre-heating of the beads necessitates less of a temperature rise of the beads in the mold.

In addition to the hot and cold water circulating systems, as has been previously described, air lines are necessary for conducting air under pressure into the air inlet ports 144, 145, 181 and 80 of the mold apparatus. These lines are connected respectively to the air inlet ports 144, 145, 181 and 80 through suitable valving. The air lines are then connected to a source of pressurized air. Similarly, a vacuum line is connected to the mold apparatus at the vacuum annulus 131 by means of the threaded socket 131a which is in communication with the annulus. The vacuum line is connected to a vacuum pump to supply a high vacuum within the annulus of approximately 10 microns of Hg in the presently preferred embodiment. In addition a conduit suitable for transmitting the plastic beads from a pre-expander, which is of the type well known to the art and not shown in connection with the present invention, to the plastic inlet line 190 and into the plastic feeding annulus 180.

Figure 8:
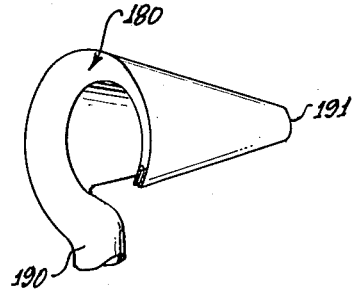
FIGURE 8 is a detailed view in perspective illustrating the filling opening of the mold of FIGURE 2.

Thus, referring to FIGURE 8, the plastic conduit 270 is connected at the threads 191 of the mold apparatus and extends from a plastic bead manifold through a plastic inlet line 272 through a one-way flapper valve 273 which permits the passage of the plastic beads from the hopper in which they are stored in the pre-expanded condition, and thence from the flapper valve to the plastic inlet conduit 270 and into the plastic feeding annulus 180. A return line is provided between the manifold 271 and the plastic conduit 270 which allows the return of plastic beads which have entered the annulus 180 and been removed therefrom as excess material. Thus, beads blown from the annulus 180 by air admitted through the air inlet port 181 when the plunger is at the extended position at which it closes the opening 104, are blown from the line 270 and upward through a one-way valve 274 which permits their return to the manifold and their circulation back through the pre-expansion hopper. This is done since the plastic beads will acquire an electrostatic charge due to friction and movement. Due to such charge they have a tendency to adhere and to prevent the proper filling of the mold cavity 25. Thus, by means of the one-way valves which furnish a supply of fresh beads to the plastic inlet 270 and return the beads which have been passed into the mold back to the pre-expansion hopper, a supply of fresh material is continually fed to the plastic inlet annulus 180. By returning the beads to the hopper they are allowed to discharge their static charge while positioned within the hopper.

Figure 4:
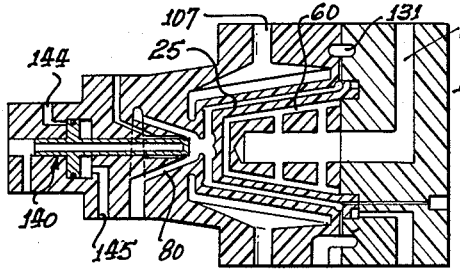
FIGURES 4, 5 and 6 show the mold in accordance with FIGURE 2 at various stages of the molding operation.
Figure 5:
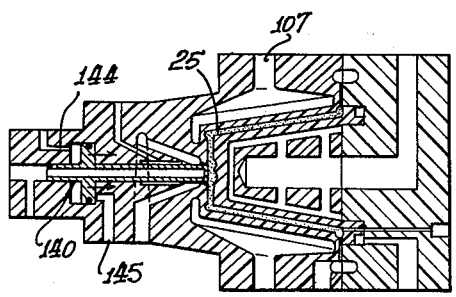

Referring now to FIGURES 1 and 8, and FIGURES 4, 5 and 6, the operation of the apparatus of the present invention and the method of the present invention can be described in connection with the presently preferred embodiment of the apparatus as shown and described hereinabove for forming a thin-walled cup. The cup is of the configuration shown in FIGURE 7 with a recessed or concave bottom and smooth frusto-conical side walls with a lip 41 at the upper edge of the cup as shown in the figure. Referring particularly to FIGURES 2 and 4, the mold apparatus M is mated by bringing the female portion and male portions thereof into engagement by means of operating mechanisms such as the operating rod 73 which can be reciprocated by a hydraulic piston or other means well known to the art. In FIGURE 2 the molding apparatus is shown in its mated position at which it defines the closed cavity 25 into which the pre-expanded plastic beads are to be injected. Thus, the two body portions of the mold are mated at the parting line P and are further urged into the mated position by reason of the vacuum created externally of the mold. At this load position as shown in FIGURE 4 the plunger assembly 140 is in the retracted position which is obtained by admitting air through the valve 255 to the air line or path 145 which subjects the inner side of the piston 145 to air pressure, to in turn force the piston toward the left in FIGURE 2 and maintain the plunger assembly at the retracted position. In this position the plastic feeding annulus 180 is in communication with the opening 104 through the end wall 103 of the female mold element. The mold cavity 25 is fully closed except for the opening 104. The vacuum pump 262 is creating a vacuum through the line 261 into the vacuum annulus 131. The vacuum in the annulus extracts air from the mold cavity 25 through the small circular opening 135. As described in connection with FIGURE 8, the plastic beads are drawn from the manifold 271 which leads from the pre-expansion hopper to provide beads at the one-way check valve 273. With the plunger retracted and the vacuum annulus 131 creating a vacuum in the mold cavity 25, the beads are drawn into the plastic feeding annulus 180 and thence through the opening 104 through the end wall of the female mold element 100. As the plastic beads pass through the opening 104 they strike the double concave surface 52a in the end wall surface 52 causing them to be dispersed radially into the bottom portion of the mold cavity 25 and to progress uniformly longitudinally through the mold cavity until they reach the lip 41 of the cavity at the inner end thereof between the flanges 102 and 55 of the male and female mold elements respectively. After the proper quantity of pre-expanded plastic beads have passed into the mold cavity 25 to fill the mold cavity the air pressure in the cylinder 142 is reversed in direction by admitting air under pressure through the valve 254 into the air passage 144 at the left side of the piston 141 and opening the valve 255 to the atmosphere to let the air under pressure force the plunger assembly 140 to the right in FIGURE 2, as shown in FIGURE 5. At this position the plunger assembly closes the mold cavity by causing the inner end 150 of the plunger to close the opening 104 as shown in FIGURE 5. Any plastic beads remaining within the plastic feeding annulus 180 are then blown therefrom by admitting air through the air passage 181 by means of the valve 257 in the air line 252. The beads blown from the annulus and thus from the passage 190 are blown outward through the plastic conduit 270 and through the one-way check valve 274 back to the manifold 271 from whence they are returned to the hopper.

The molding apparatus is then in the loaded position at which the mold cavity 25 is fully closed with the proper amount of expandable plastic material therein. The vacuum is continued in the vacuum annulus 131 such that the air pressure within the mold cavity 25 is substantially less than atmospheric. Hot water is then admitted by means of the electric cycle timer which operates the hot water valve 101 and admits hot water through the inlet line 200 from whence it passes into the molding apparatus at the hot water inlet conduits 66, 107 and 170. Upon passing into the hot water inlet conduit 66 the water progresses through the orifices 61, 62, 63, 64 and 65 and into the hot water annulus 60 at the inner wall of the male mold element, thus heating the male mold element to the required temperature. Simultaneously the hot water passing inward through the hot water inlet conduit 107 is spread longitudinally and passes into the groove 109 into each of the annulus fluid flow paths 114 such that it progresses circumferentially around the exterior wall of the female mold element to heat the mold element to the required temperature. At the same time the hot water passes into the fluid conduit 167 through the inlet 170 and to the inner end 150 of the plunger to heat the end of the plunger to the required temperature. Thus, with the plunger in the extended or closed position at which it forms the remainder of the closed surface of the mold cavity, all of the mold cavity defining surfaces which are formed of aluminum are heated to the required temperature by the hot water. The hot water is left in the mold apparatus for the time required to heat the expandable plastic beads to the required temperature.

It should be noted at this time that the body portions of the molding apparatus are formed of a non-heat-conducting materal such as epoxy resin. All of the heat is concentrated at the mold element surfaces such that the material within the cavity 25 can be heated quickly from a temperature which is considerably cooler than the required expansion and fusion temperature of the plastic material. In the presently preferred embodiment with the water at a temperature of approximately 310° under a pressure of 100 p.s.i. the cycle time required to heat the material contained within the mold cavity to the required temperature is approximately five seconds. After the plastic material has expanded and fused, i.e., after a time interval of approximately five seconds, the cycle timer opens the valve 204 to discharge the hot water within the molding apparatus and at the same time opens the valve 210 to admit cooling water to the molding apparatus in the same flow path as previously described, at which it surrounds the mold element to reduce the temperature of the mold cavity 25. Again in the presently preferred embodiment a cooling time of approximately five seconds is required. During the heating and cooling portions of the operating cycle the apparatus remains as shown in FIGURE 5 with the mold cavity closed but with the vacuum operating in the vacuum annulus 131 such that the cavity is constantly subjected to the decreased ambient pressure. At the end of the cooling cycle the plastic material will have fused and formed the cup as shown in FIGURE 7. The vacuum in the annulus and cavity is then released, after which the mold apparatus is opened by retracting the male portion from the female portion by means of the operating rod 73. When the male portion is retracted, the cup will be retained thereon due to the radial indentations in the exterior surface of the wall of the male mold element, which allow the plastic material to be formed therein in order that the male mold element will carry the molded object with it when the mold is separated. Accordingly, when the mold has been separated, air is admitted through the air line 253 by means of the valve 258 and into the air path 80 which projects the air into the small annular groove 82. Air passing outward from the groove flows between the male mold wall and the inner wall of the cup to force the cup from the male mold element and thus to eject it from the molding apparatus. At this point the molding cycle has been completed and the apparatus is ready for another production cycle. The total cycle time in connection with the presently preferred embodiment of the apparatus has been found to be approximately twelve seconds.

An alternative embodiment of the parts of the apparatus defining the ejection air path is shown in FIGURE 14. In this embodiment the ejection air annulus 82' is adapted to a cup configuration having a smooth side wall with no discontinuity or shoulder such as 46 in the presently preferred embodiment. Accordingly, the ejection air annulus is positioned at the upper lip of the cup in communication with the air passage 80 to again blow air between the cup and male mold to remove the cup therefrom.

Referring now to FIGURES 12 and 13 there is shown partially schematically an alternative embodiment of the apparatus for feeding the plastic beads to the mold cavity in the required quantity. In the alternative embodiment a gravity flow of plastic beads to the opening 104 of the mold cavity is utilized to supplement the vacuum force causing the beads to be drawn into the cavity. Thus, as shown in FIGURE 12, the plastic beads enter the mold apparatus and flow downward to the plunger 300 through an upwardly extending inlet port 301. When the plunger is in the retracted or load position the inlet port is open and in communication with the opening 104. After the proper quantity of beads have been drawn into the mold cavity, the plunger is moved forward to the closed position and the piston 302 closes the inlet port and opens a downward extending outlet port 303. Excess beads then travel downward through the outlet port and from the mold apparatus. Any beads remaining are blown from the vicinity of the plunger by a stream of air admitted through the air inlet port 305 as previously described.

Thus, the present invention provides an improved apparatus for molding articles from expandable plastic beads. By means of the present invention uniform molding conditions are achieved and the beads are expanded and fused under reduced pressure in order to increase the pressure differential between the interior and exterior of the individual beads. The beads are fed automatically and uniformly to the mold cavity in the closed condition of the mold and the apparatus is particularly adapted to fully automatic operation.

What is claimed is:

1. An apparatus for forming a thin-walled article of manufacture by the expansion and fusion of expandable fusible plastic beads comprising: a mold apparatus housing, said housing being longitudinally separable along a transverse parting line and including a male mold housing and a female mold housing, said male and female mold housing being formed of insulating material; a male mold element carried by said male housing and a female mold element carried by said female mold housing, said male and female mold elements being mateable at the mated position of said male and female housing to provide a mold cavity defining by the interior walls thereof the configuration of the article to be molded; a vacuum air passage defined by said mated male and female mold elements in communication with said cavity proximate one end thereof; a plastic inlet opening to said cavity at the second end thereof opposite said one end, said female mold element defining said opening, said opening extending axially into said cavity, said opening having a cross-sectional configuration substantially less than the cross-sectional configuration of said second end of said mold cavity, said female housing defining a plastic inlet passage therethrough in communication with said plastic opening; means for admitting said plastic beads into said plastic inlet passage; a longitudinally reciprocal plunger mounted in said female housing and movable from a first to a second position, said plastic inlet passage being in communication with said plastic inlet opening at said first position of said plunger, said plunger at said second position thereof closing said inlet opening; means for moving said plunger selectively from said first to said second position; means for selectively extracting air from said cavity through said vacuum passage when said plunger is in said first position to thereby create a pressure in said cavity substantially less than atmospheric to draw said beads from said plastic inlet passage into said cavity; means for selectively heating said plunger proximate said inlet opening; means for exhausting air through said inlet passage at said second position of said plunger to exhaust beads therefrom back to said bead admitting means; a first fluid passage defined by said female mold housing surrounding said female mold element; a second fluid passage defined by said male mold housing surrounding the interior wall of said male mold element; means for selectively conducting heated fluid to said passages to raise the temperature within said cavity to a temperature above the expansion and fusion temperature of said beads; means for selectively conducting cooling fluid to said passages to lower the temperature within said cavity to a temperature below the expansion and fusion temperature of said beads; and means for separating said mold housing to remove the molded article from said apparatus.

2. An apparatus for forming a thin-walled plastic cup by the expansion and fusion of expandable fusible plastic beads comprising: a mold apparatus housing, said housing being longitudinally separable along a transverse parting line and including a male mold housing and a female mold housing, said male and female mold housing being formed to insulating material; a male mold element carried by said male housing and a female mold element carried by said female mold housing, said male and female mold elements being mateable at the mated position of said male and female housings to provide a mold cavity defining by the interior walls thereof the configuration of the cup to be molded, said molded cavity having longitudinally extending frusto-conical side walls and a transverse end wall; a vacuum air passage defined by said mated male and female mold elements in communication with said cavity proximate one end thereof; a plastic inlet opening to said cavity at the second end thereof opposite said one end through said end wall of said cavity; said female mold element defining said opening, said opening extending axially into said cavity, said opening having a cross-sectional configuration substantially less than the cross-sectional configuration of said transverse end wall of said mold cavity, said female housing defining a plastic inlet passage therethrough in communication with said plastic opening; means for admitting said plastic beads into said plastic inlet passage; a longitudinally reciprocal plunger mounted in said female housing and movable from a first to a second position, said plastic inlet passage being in communication with said plastic inlet opening at said first position of said plunger, said plunger at said second position thereof closing said inlet opening; means for moving said plunger selectively from said first to said second position; means for selectively extracting air from said cavity through said vacuum passage when said plunger is in said first position to thereby create a pressure in said cavity substantially less than atmospheric to draw said beads from said plastic inlet passage into said cavity; means for selectively heating said plunger proximate said inlet opening; means for exhausting air through said inlet passage at said second position of said plunger to exhaust beads therefrom back to said bead admitting means; a first fluid passage defined by said female mold housing surrounding said female mold element; a second fluid passage defined by said male mold housing surrounding the interior wall of said male mold element; means for selectively conducting heated fluid to said passages to raise the temperature within said cavity to a temperature above the expansion and fusion temperature of said beads; means for selectively conducting cooling fluid to said passages to lower the temperature within said cavity to a temperature below the expansion and fusion temperature of said beads; and means for separating said mold housing to remove the molded article from said apparatus.

References Cited in the file of this patent

UNITED STATES PATENTS

| | | |
|---|---|---|
| 2,308,971 | Carter | Jan. 19, 1943 |
| 2,686,934 | D'armore | Aug. 24, 1954 |
| 2,744,291 | Stastny et al. | May 8, 1956 |
| 2,773,284 | Kelly | Dec. 11, 1956 |
| 2,860,374 | Harrison et al. | Nov. 18, 1958 |
| 2,951,260 | Harrison et al. | Sept. 6, 1960 |